US012030748B2

(12) United States Patent
Lundmark

(10) Patent No.: US 12,030,748 B2
(45) Date of Patent: Jul. 9, 2024

(54) PORTABLE LIFTING DEVICE

(71) Applicant: Staffan Lundmark, Skelleftea (SE)

(72) Inventor: Staffan Lundmark, Skelleftea (SE)

( * ) Notice: Subject to any disclaimer, the term of this patent is extended or adjusted under 35 U.S.C. 154(b) by 0 days.

(21) Appl. No.: 17/568,297

(22) Filed: Jan. 4, 2022

(65) Prior Publication Data

US 2023/0211983 A1 Jul. 6, 2023

(51) Int. Cl.
*B66C 1/66* (2006.01)

(52) U.S. Cl.
CPC ...................................... *B66C 1/66* (2013.01)

(58) Field of Classification Search
CPC .... B66C 1/66; B66C 1/12; B66C 1/14; B66C 1/28
USPC ........................... 294/81.1, 81.56, 82.1, 67.1
See application file for complete search history.

(56) References Cited

U.S. PATENT DOCUMENTS 2,547,502 A * 4/1951 Christianson ........... B66C 1/663 294/81.51
2,696,317 A * 12/1954 Toffolon ................. B66F 9/061 294/81.1
2,700,568 A * 1/1955 Meili ........................ B66C 1/14 294/81.1
2,730,398 A * 1/1956 Huested ................... B64D 1/22 294/82.26
4,826,228 A * 5/1989 Dinitz ....................... B66C 1/12 294/67.1
5,269,579 A * 12/1993 DeCrane ................... B66C 1/10 24/68 CD
5,476,300 A * 12/1995 Dodge ...................... B66C 1/54 294/93
6,081,573 A * 6/2000 Akimoto ................... B66C 1/10 376/254
D502,756 S * 3/2005 Birdwell ...................... D22/199
7,290,815 B1 * 11/2007 Whittington .............. B66C 1/16 294/67.4
8,622,449 B1 * 1/2014 Stroh ........................ B66C 1/16 294/81.5

* cited by examiner

*Primary Examiner* — Paul T Chin

(57) ABSTRACT

Lifting device (1) intended for use in lifting sacks or the like, which lifting device (1) comprises at least a first lifting device part (2), at least a second lifting device part (3) and at least one locking mechanism (4). The lifting device (1) the first lifting device part (2) and the second lifting device part (3) can be connected and disconnected from each other, and that the first lifting part (2) and the second lifting part (3) can be temporarily locked with each other with at least one first locking mechanism (4).

1 Claim, 7 Drawing Sheets

PORTABLE LIFTING DEVICE

TECHNICAL FIELD OF THE INVENTION

The present invention relates to a lifting device according to the claims.

BACKGROUND OF THE INVENTION

Through the past, many different types of lifting devices such as lifting hooks and lifting devices have been developed. Said lifting hooks and lifting devices are intended to be connected to a crane, or other type of lifting equipment, with the intention of lifting at least one object.

For example, lifting devices intended for use in lifting larger sacks, such as so-called large sacks, have been developed. Said sacks, such as large sacks, usually comprise in these open ends four or more loops which are used to connect the sack to a lifting device or lifting device. Although several lifting devices and lifting devices have been developed for lifting sacks and the like, there are still problems with these. For example, there are problems with effectively holding big bags in an open position when lifting.

Another problem with lifting devices for big bags is that these lifting devices are relatively heavy. They therefore become difficult for the user to handle. Furthermore, lifting devices for big bags are usually bulky to store when not in use.

Usually, the lifting devices consist of two or more parts which are welded together and form the lifting device. Because the components are welded together, these cannot be disconnected, which usually means that these lifting devices are usually bulky. This means that they are not always in a vehicle with which lifting is performed.

An additional problem with existing welded lifting equipment is that its welds must be checked. This means that different types of test procedures need to be performed. This results in an increase in the cost of the construction in relation to the previously known construction.

The Object of the Invention

The object of the present invention is to eliminate or substantially reduce at least one of the problems described in the background. This is solved with a lifting device in accordance with the claims.

BRIEF DESCRIPTION OF THE DRAWINGS

In the following detailed description of the lifting device, references and references to the following figures will be made. Note that the figures are schematic and certain parts of the lifting device may be omitted which are obvious to a person skilled in the art in the technical field of which the lifting device is included.

DETAILED DESCRIPTION OF THE INVENTION

Figure 1A:
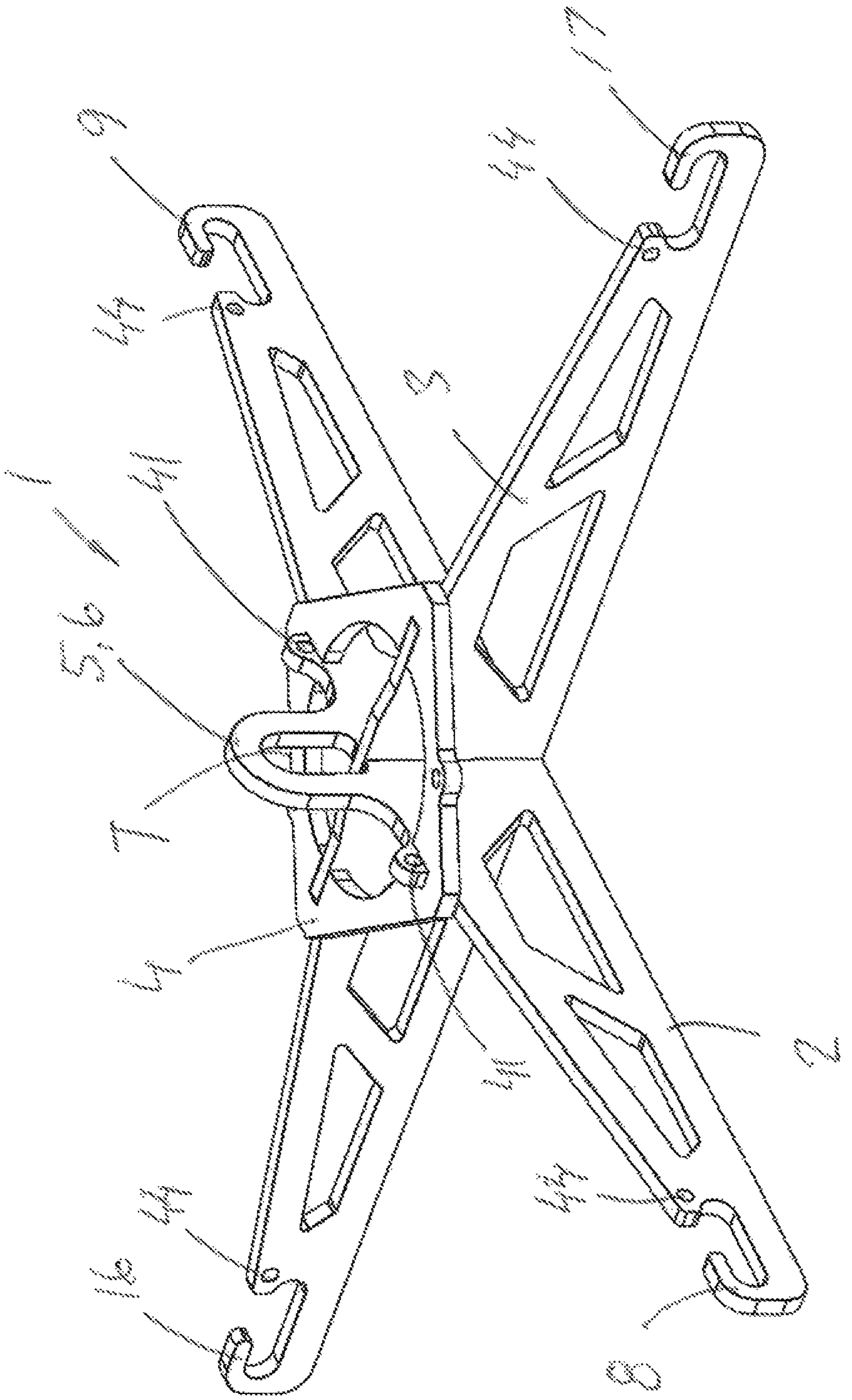
FIG. 1A shows a first embodiment of the present lifting device in a coupled position.

With reference to the figures, an in accordance with the present invention, a lifting device 1 will be described in more detail. Alternatively, the lifting device can be defined as a lifting hook or some other professional used definition. The lifting device 1 is preferably intended for use in lifting objects such as preferably sacks, big bags, and the like. The present lifting device 1 can also be used for lifting objects other than said big bags. Although the present invention is described as a lifting device 1, this can in alternative embodiments be used in other applications.

In the present description, terms upper and lower are used which refer to the mutual relationship between parts of the lifting device when using the lifting device. It is also used upwards and downwards to indicate the direction during normal use of the lifting device.

The lifting device 1 comprises at least one first lifting device part 2. It is conceivable that the first lifting device part 2 is used separately for lifting via a first lifting point and a second lifting point.

In the preferred embodiment, the lifting device 1 comprises at least a first lifting device part 2 and at least a second lifting device part 3 and at least one first locking member 4. The first lifting device part 2 consists of an upper lifting device part and the second lifting device part 3 consists of a lower lifting device part.

The first lifting part 2 and the second lifting part 3 are designed so that these can be connected and disconnected from each other. The first lifting device part 2 and the second lifting device part 3 are temporarily locked together in assembled position with the first locking means 4. Characteristic of the present lifting device 1 is thus that it can be packed together, entailing a substantial reduction of the space which the disassembled lifting device 1 takes up in relation to when the parts of the lifting device 1 are connected.

Figure 2:
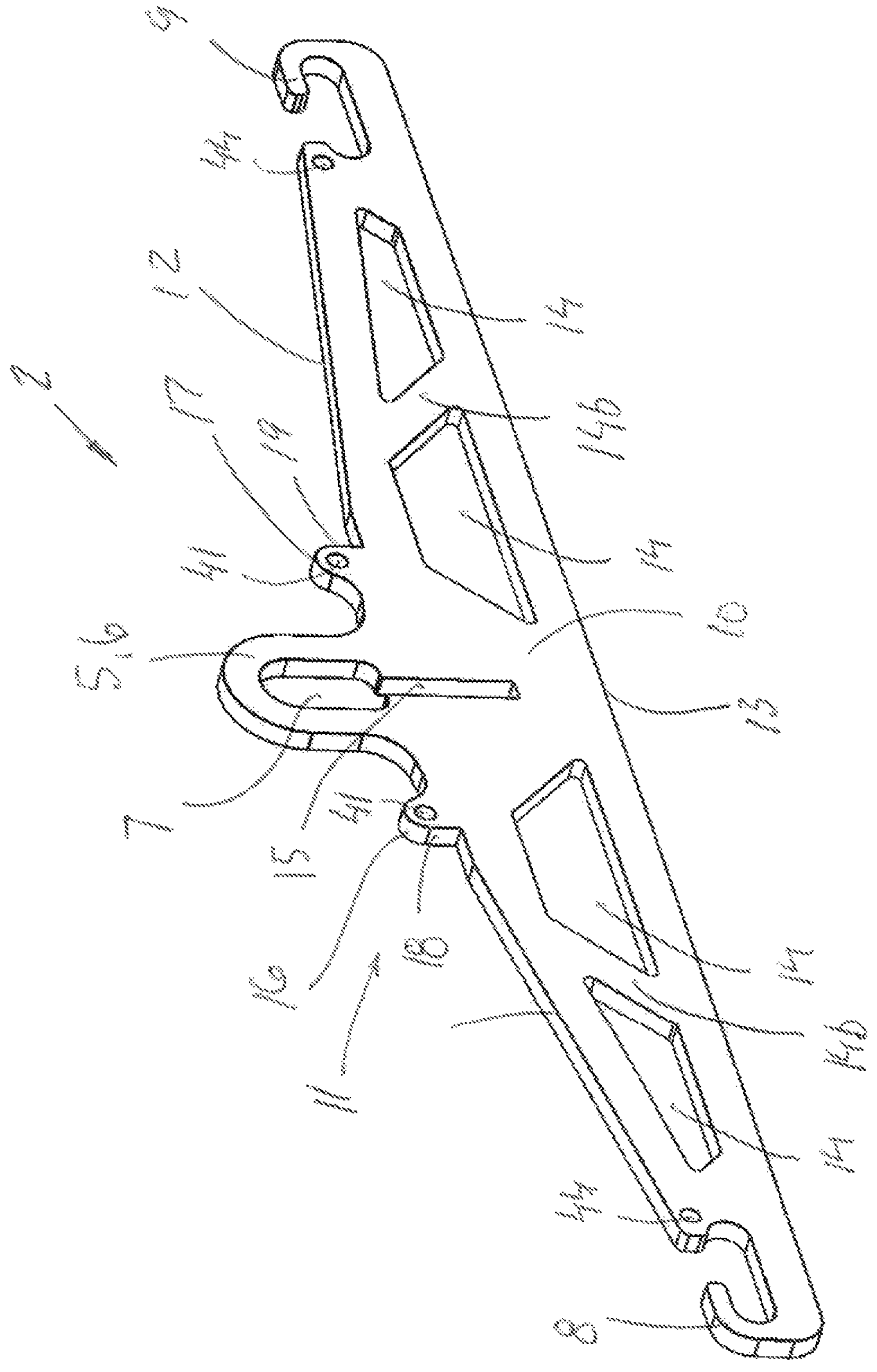
FIG. 2 shows a first exemplary first lifting device part in more detail.

Referring to FIG. 2, an exemplary embodiment of the first lifting device part 2 is shown. The first lifting device part 2 has an elongate shape comprising a first fastening ear 5, bracket or the like. The first mounting ear 5 is intended to be connected to a lifting device such as a hook in a crane or the like. In the exemplary embodiment, the first mounting ear 5 consists of a first protruding segment 6, alternatively defined as a first projecting segment 6, in the upward direction, which protruding segment has at least one hole 7 in which a lifting hook or the like is connected. The hole 7 in the exemplary embodiment has a height which is greater than its width.

The first lifting device part 2 further comprises at least one first bracket 8 and at least one second bracket 9. The bracket 8 bracket and the second bracket 9 are hook-like in the exemplary embodiment. When lifting a large sack, for example a first loop in the sack is connected to the first bracket 8 and for example a second loop in the sack is connected to the second bracket 9. When lifting other objects, lifting loops or the like can be connected to the first bracket 8 and the second bracket 9. The construction of the first lifting device part 2 can be like a roof truss-like construction, but substantially smaller, which comprises a truss construction.

The first lifting part 2 comprises a first side 10 and a second side 11 with a thickness. Furthermore, the first lifting device part has an upper edge 12 and a lower edge 13. The lower edge 13. The upper edge 12 is highest in the middle of the first lifting device part 2 and lowest in the ends of the second lifting device part 2. The first lifting device part 2 comprises a plurality of holes 14 openings or the like with at least one delimiting strut 14*b* extending in an obliquely upward direction. The described construction of the first lifting device part allows high strength in relation to weight.

In the downward direction, the hole 7 of the ear 6 merges into a groove 15, recess or the like which extends a piece in the downward direction towards the lower edge 13. The width of the groove 15 is slightly greater than the thickness of the second lifting part 2. The groove 15 is in the middle of the first lifting device part 2.

In the exemplary embodiment, the first lifting device part 2 comprises at least one second protruding segment 16, alternatively defined as a second, projecting segment 16, which extends a distance from the upper edge 12 of the first lifting device part 2 in the upward direction. The first lifting device part 2 comprises in the exemplary embodiment at least a third protruding segment 17, alternatively defined as a third projecting segment 17, which extends a distance in the upward direction from the upper edge 12 of the first lifting part 2. The second protruding segment 16 is located at a distance from the first projecting segment 6 in the direction of the first end of it the first lifting device part. The third protruding segment 17 is located at a distance from the first projecting segment 6 in the direction of the second end of the first lifting device part 2, The outer edge 18 of the second projecting segment 16, in the direction of the first end of the first lifting device part 2, and the outer edge 19 of the third protruding segment 17, in the direction of the other end of the first lifting device part 2 are placed at a distance X1 from each other.

The second protruding segment 16 and the third protruding segment 17 each comprise a through hole 41.

Figure 3:
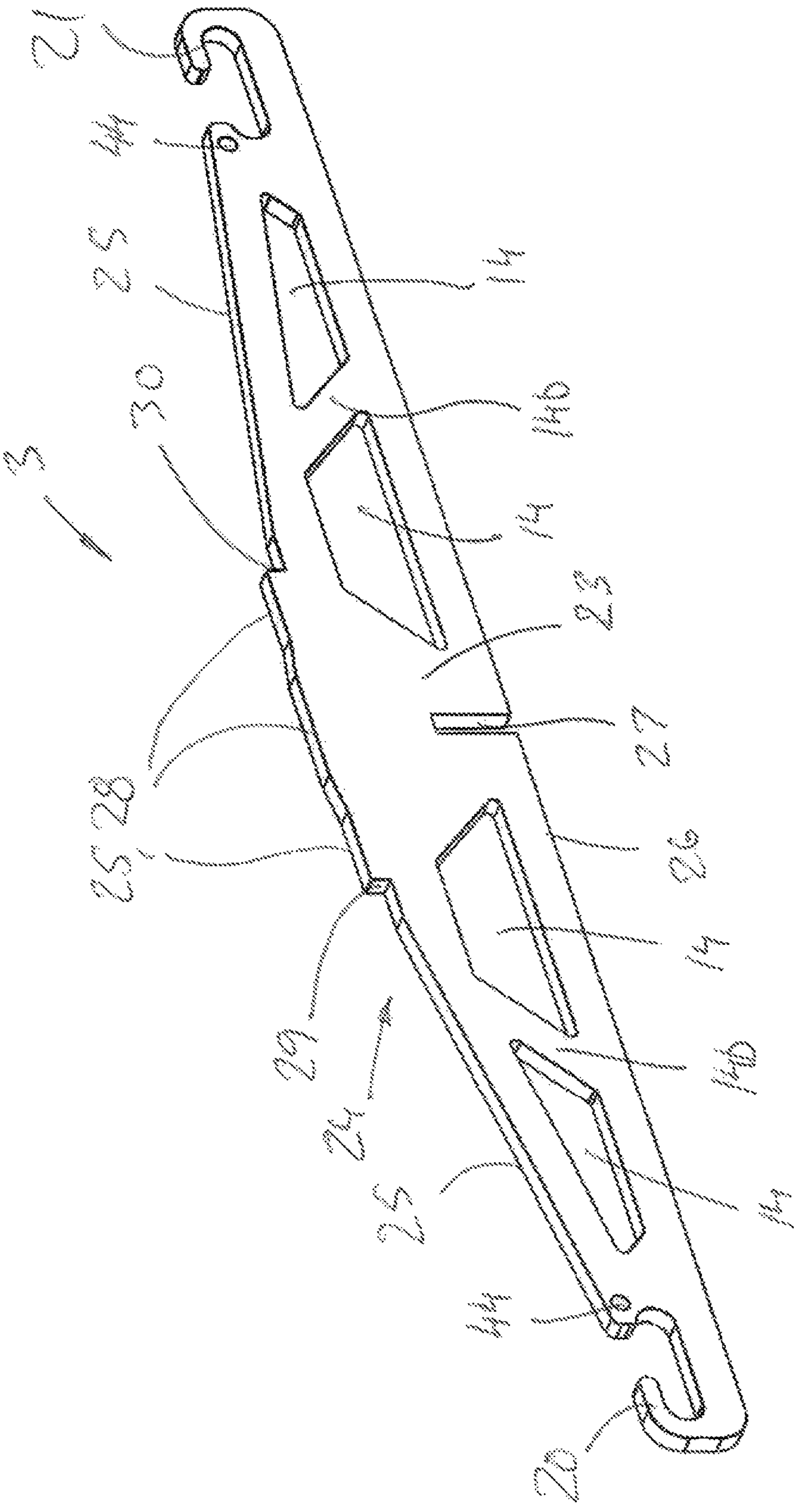
FIG. 3 shows an exemplary second lifting device part in more detail.

Referring to FIG. 3, an exemplary embodiment of the second lifting device part 3 is shown. in the bag and to the fourth bracket 21, for example, a fourth loop in the bag is connected. The construction of the second lifting device part 3 can be like a roof truss-like construction, but substantially smaller, which comprises a truss construction. The second lifting device part 3 comprises at least two holes 22, openings, or the like with at least one delimiting strut 22*b* which extends in the direction obliquely upwards, Said construction of the second lifting device part 3 allows high strength in relation to weight.

The second lifting device part 3 comprises a first side 23 and a second side 24 with a thickness. The length, width, and height of the second lifting part 3 are adapted to the length, width, and height of the first lifting part 2. Furthermore, the second lifting device part 3 has an upper edge 25 and a lower edge 26 (lower edge). In the exemplary embodiment, the lower edge 26 is straight. The upper edge 25 is highest in the middle of the second lifting device part 3 and lowest in the ends of the second lifting device part 3.

The second lifting device part 3 comprises at least one second groove 27, recess or the like which extends from the lower edge 26 (open in the downward direction) a distance in the upward direction. The width of the groove 27 is slightly greater than the thickness of the first lifting part 2. The groove 27 starts from the middle of the lower edge 26 of the second lifting device part 3.

The second lifting device part 3 comprises in the exemplary embodiment at least a fourth protruding segment 28, alternatively defined as a fourth projecting segment, which extends a distance from the upper edge 25 of the second lifting device part 3 in the upward direction. The fourth protruding segment 28 is defined in the direction of the first end of the second lifting device part by a third outer edge 29 and in the direction of the second end of the second lifting device part 3 by a fourth outer edge 30. The third outer edge 29 and the fourth outer edge 31 of the fourth protruding segment 28 are located at a distance X2 from each other.

Figure 4:
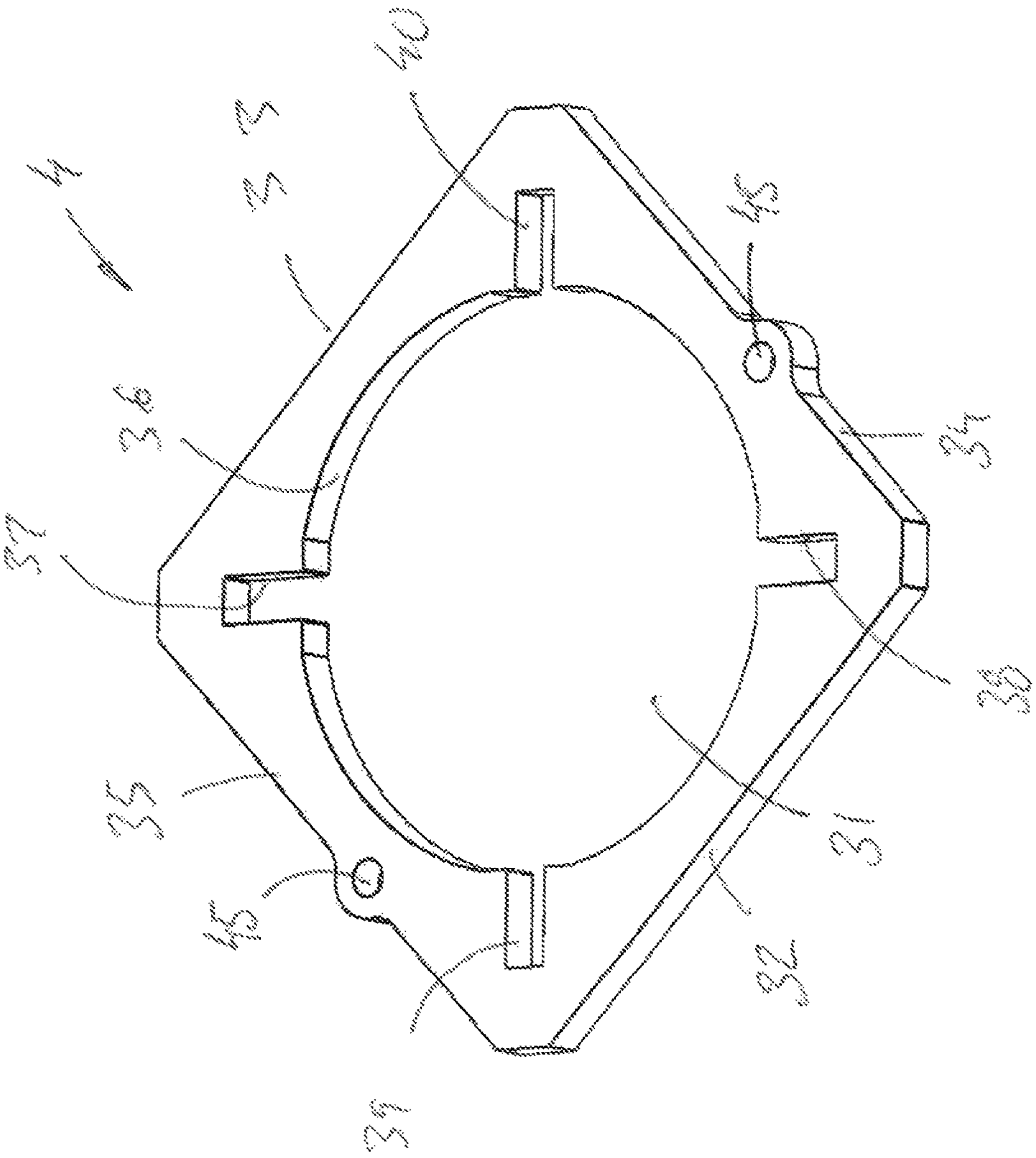
FIG. 4 shows an exemplary locking means more in detail.

Referring to FIG. 4, an exemplary embodiment of the first locking member 4 is shown. In the exemplary embodiment, the first locking member 4 has a substantially square outer shape with a centrally located hole 31. The locking member 4 comprises a first side 32 with a first opposite side 33 and a second side 34 with a second opposite side 35. The locking member 4 has a thickness which is substantially smaller than its sides. The edge 36 of the hole 31 comprises at least a first recess 37 and at least a second recess 38. In the first recess 37 and the second recess 38 the second projecting segment 16 of the first lifting device part 3 and the third projecting segment 17, respectively, are intended to be inserted.

The edge 36 of the hole 24 further comprises at least a third recess 39 and at least a fourth recess 40. In the third recess 39 and the fourth recess 40, the fourth projecting segment 28 of the second lifting device part 3 is intended to be inserted.

When connecting the lifting device 1, the second lifting device part 3 is passed through the holes 7 of the fastening ear 5 and the first groove 15. The first groove 15 and the second groove 27 are connected to each other. After the first lifting part 2 and the second lifting part 3 have been connected, the locking means 4 are connected to these.

The first lifting device part 2, the second lifting device part 3 and the locking member 4 can be connected so that they are held together. This can be done in that the lifting device 1 comprises cohesive means 42 with which the parts of the lifting device are connected to each other.

Figure 1B:
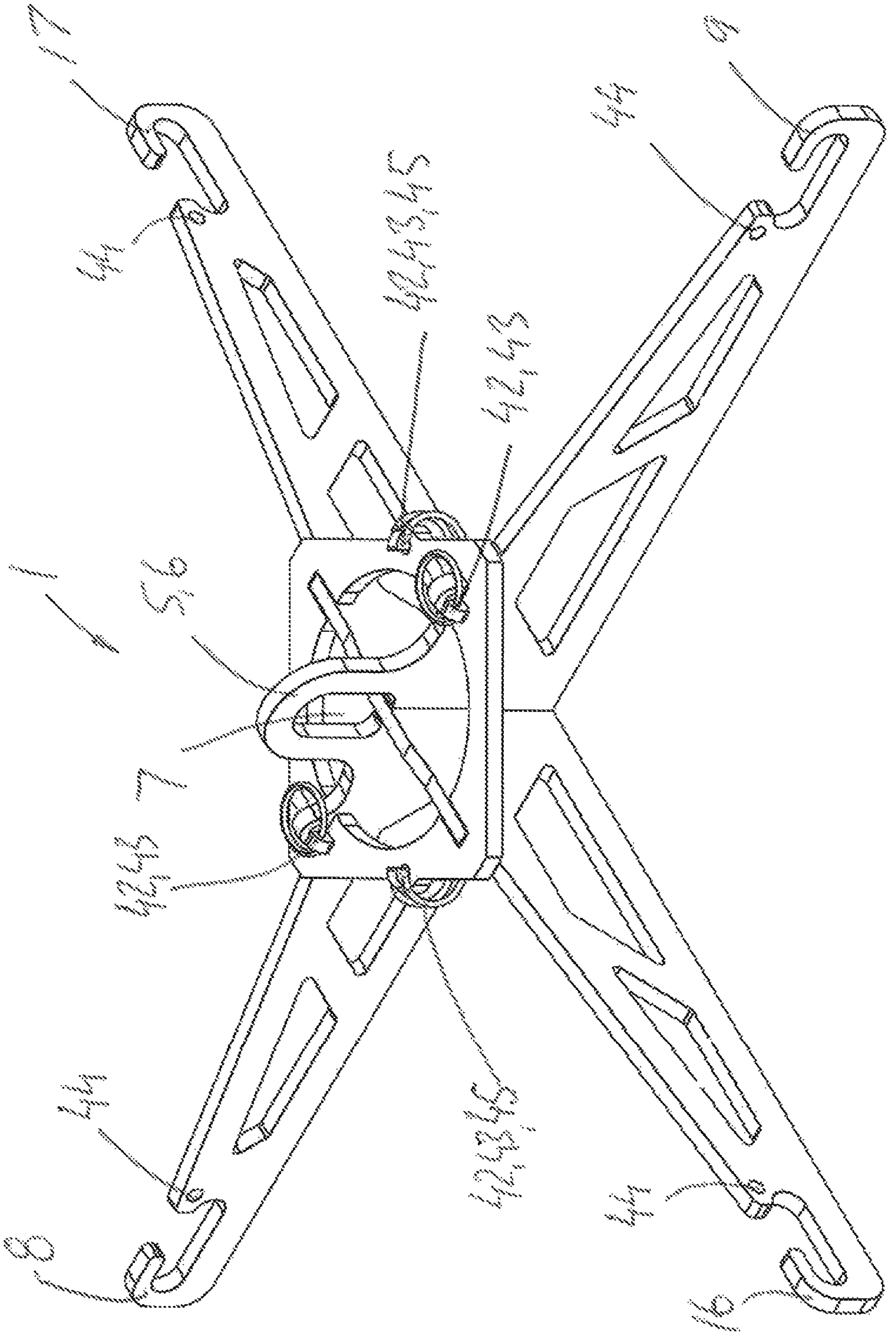
FIG. 1B shows the first embodiment in coupled position where it is locked in the coupled position with locking pins.

Referring to FIG. 1B, an example is shown of how the locking member 4, in the locked position, can be fixed to the second lifting device part 2 and the third lifting device part 3. This can be done in that the lifting device 1 comprises cohesive means 42. The cohesive means 42 may consist of locking pins 43, ring pins or the like which are inserted into the holes in the second and third protruding segments of the first lifting device part 2.

The first lifting device part 2, the second lifting device part 3 and the locking member 4 can be connected so that they are held together. This can be done in that the lifting device 1 comprises cohesive means with which the parts of the lifting device are connected to each other.

Figure 5:
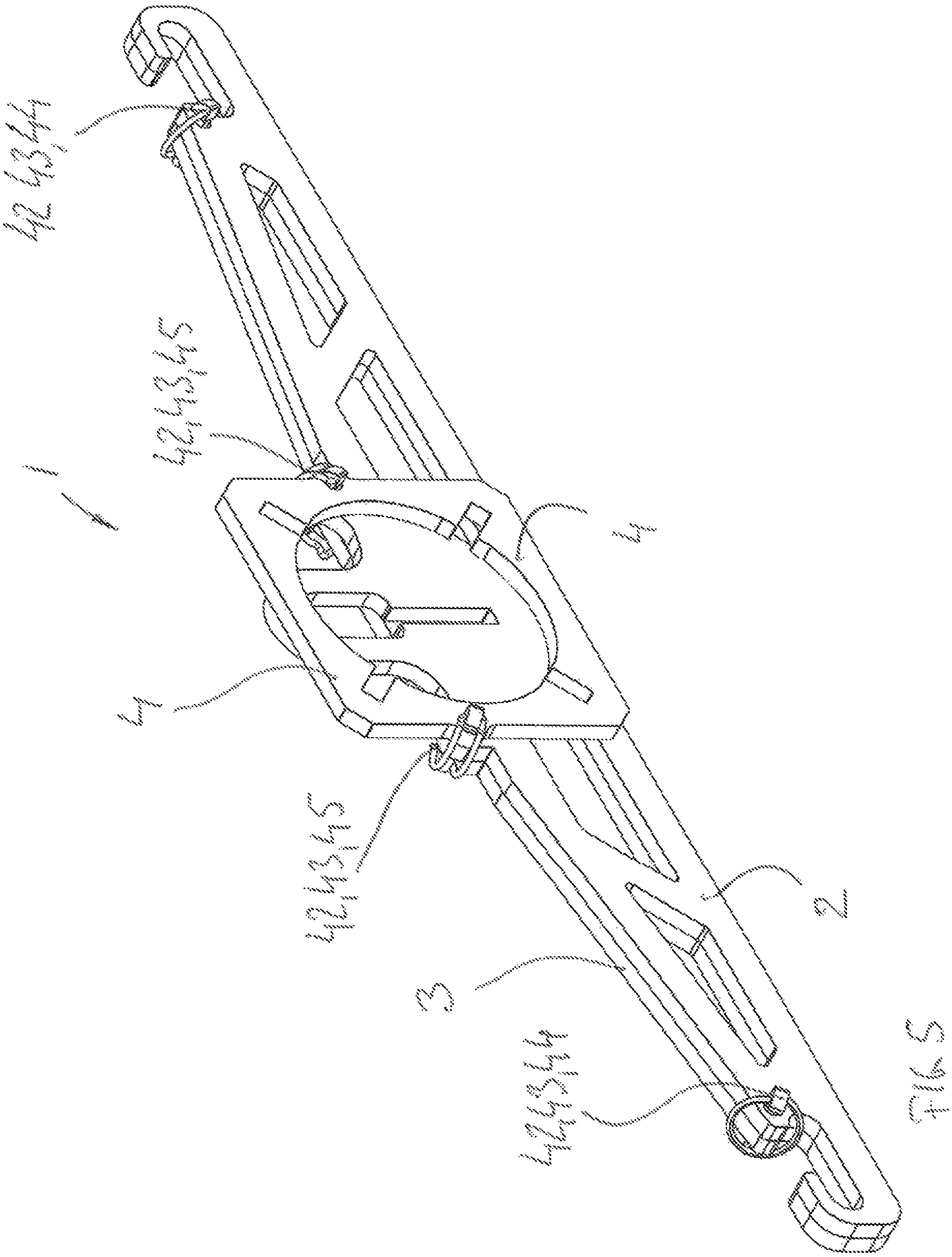
FIG. 5 shows the lifting device in the folded position.

Referring to FIG. 5, the present lifting device 1 is shown when it is packed together. When the lifting device is packed together, the space required for storage is reduced to a significant extent in relation to the space required by the lifting device 1 to be stored in an interconnected position. The first lifting device part 2, the second lifting device part 3 and the locking member 4 can be connected so that they are held together. This can be done in that the lifting device 1 comprises cohesive means 42 with which the parts of the lifting device are connected to each other. The cohesive means may be locking pins 43, ring pins or the like which are inserted into holes 41 and holes 43 in parts to be connected.

Figure 6:
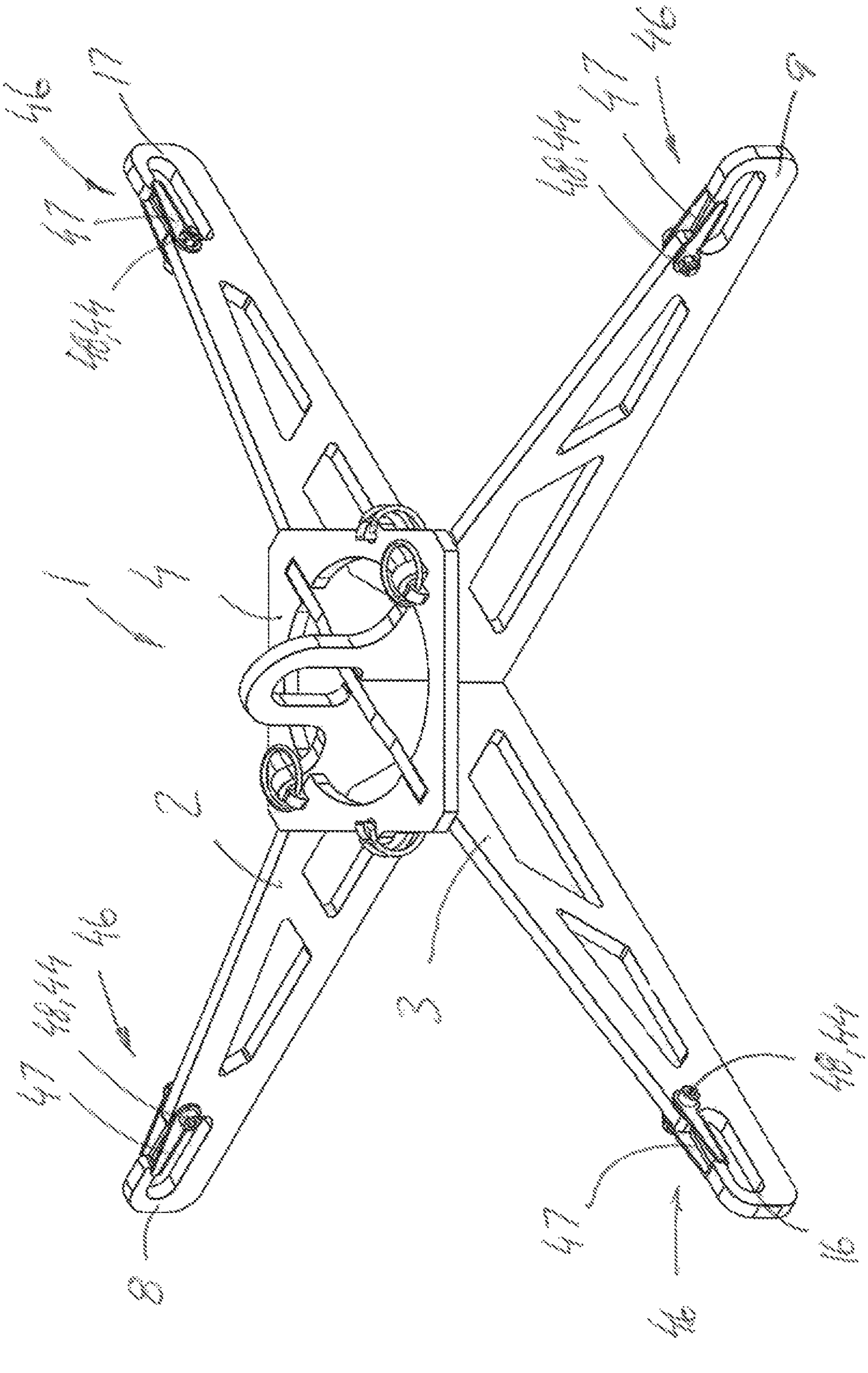
FIG. 6 shows an alternative embodiment comprising a spring-loaded locking part.

Referring to FIG. 6, an alternative embodiment of the lifting device 1 is shown. In this embodiment, the lifting device 1 comprises a safety catch 46. The safety catches 46 comprises a locking member 47 which is connected to the hole 43 via screw connections 48, pin or the like. The construction comprises a resilient member which is not shown in the figures.

In the detailed description of the present invention, details may be omitted which are obvious to a person skilled in the art within the scope of the invention. Such obvious details are included to the extent required for a proper function of the present invention to be obtained.

Although certain preferred embodiments of the hoist have been described in more detail, variations and modifications of the holster may be apparent to those skilled in the art to which the invention pertains. AU such modifications and variations are considered to fall within the scope of the appended claims.

Advantages of the Invention

With the present invention several advantages are achieved. The most important is that at least one of the problems described in the background is eliminated or reduced.

A great advantage of the present construction is that it can be assembled and disassembled, whereby a significant reduction of the volume of the product can be achieved.

The invention claimed is:

1. A lifting device (1) comprising at least a first lifting device part (2), at least a second lifting device part (3) and at least one locking means (4), the first lifting device part (2) and the second lifting device part (3) can be connected and disconnected from each other, and that the first lifting device part (2) and the second lifting device part (3) can be temporarily locked with each other with at least the locking means (4) characterized in a combination of the following;

the first lifting device part (2) and the second lifting device part (3) each comprises at least a first grove (15) in the first lifting device part (2) and a second grove (27) in the second lifting device part (3) and that the first grove (15) and the second grove (27) are connected with each other when the first lifting device part (2) is connected to the second lifting device part (3), the first lifting device part (2) at its first end includes a first bracket (8) and at its second end includes a second bracket (9), and that the second lifting device part (3) at its first end includes a first bracket (16) and at its second end includes a second bracket (17), and the first lifting device part (2) comprises a truss-like construction and the second lifting part (3) comprises a truss like construction.

* * * * *